United States Patent
Reth et al.

[15] 3,679,806
[45] July 25, 1972

[54] ELECTRIC REDUCTION FURNACE

[72] Inventors: Johannes A. Reth; Winifried H. Fettweis, both of Duisburg, Germany

[73] Assignee: Demag Elektrometallurgie GmbH, Duisburg, Germany

[22] Filed: Dec. 15, 1969

[21] Appl. No.: 885,395

Related U.S. Application Data

[62] Division of Ser. No. 754,892, Aug. 23, 1968, Pat. No. 3,615,346.

[30] Foreign Application Priority Data

March 12, 1968 Germany...............................D 55 615

[52] U.S. Cl. .......................................................13/9, 75/10
[51] Int. Cl. .........................................H05b 7/00, F27d 3/00
[58] Field of Search....................13/9, 12, 31, 34; 75/10, 11, 75/12

[56] References Cited

UNITED STATES PATENTS

| | | | |
|---|---|---|---|
| 3,043,894 | 12/1958 | Ravenscroft | 13/12 |
| 3,213,178 | 10/1965 | Sem | 13/9 |
| 3,258,256 | 6/1966 | Brooke | 13/9 |
| 3,303,257 | 2/1967 | Fujiwara et al. | 13/9 |

Primary Examiner—Bernard A. Gilheany
Assistant Examiner—R. N. Envall, Jr.
Attorney—McGlew and Toren

[57] ABSTRACT

In the production of metals and metal alloys from a charge of material containing at least one of manganese, silicon, and chromium, the charge of material is disposed within a closed combustion chamber and combustion air is directed into the closed space in a volume based on the conditions existing therein. A sufficient amount of combustion air is supplied to completely burn all of the CO in the reduction gases to form $CO_2$. The amount of combustion air supplied to the closed combustion space is in excess of the amount required to effect the complete combustion of the $CO_2$. Further, during the reduction operation, the charge is worked by stirring means or the like to assure the permeability of its surface for the release of the reduction gases.

4 Claims, 8 Drawing Figures

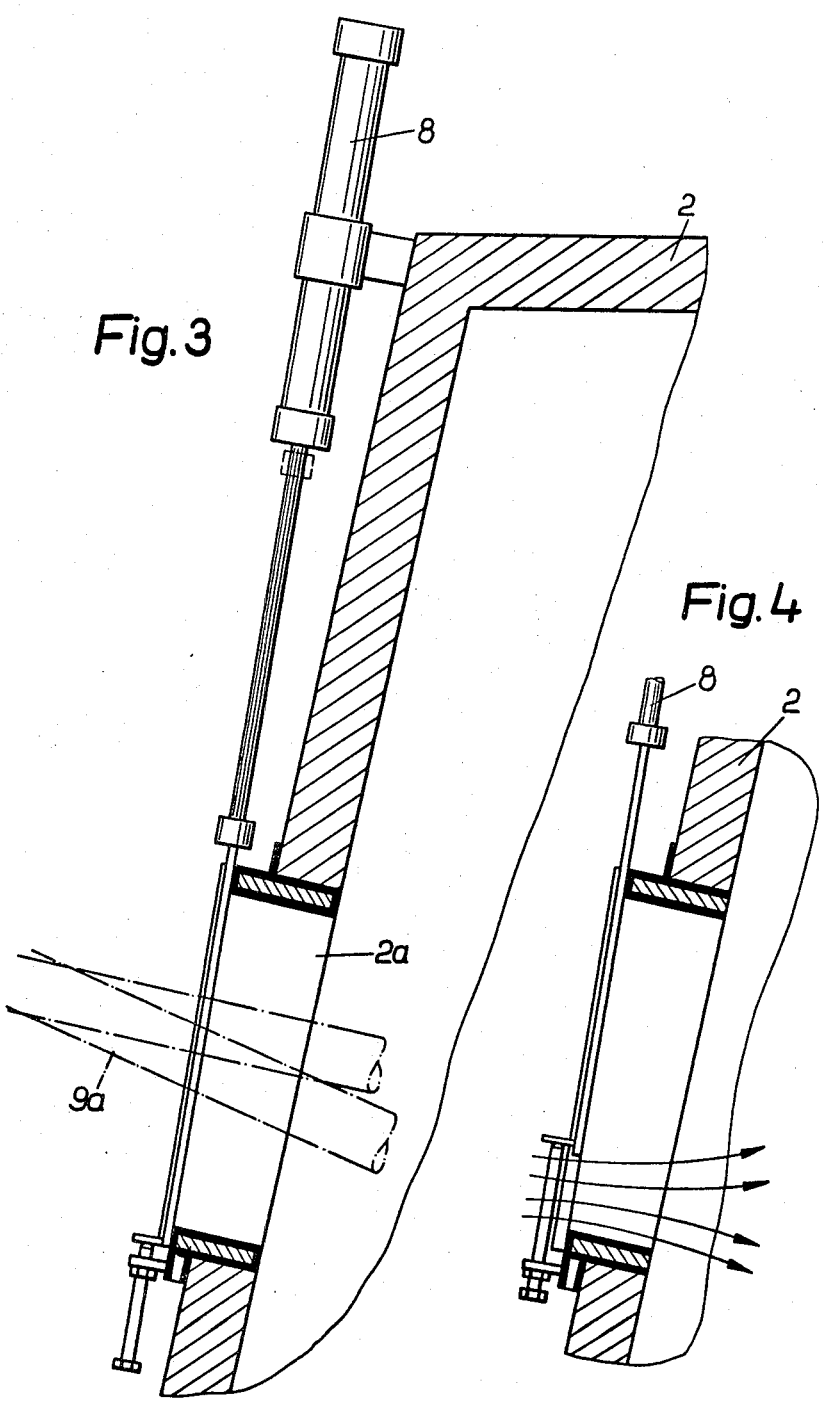

ELECTRIC REDUCTION FURNACE

CROSS REFERENCE TO RELATED APPLICATION

This application is a division of application Ser. No. 754,892 filed Aug. 23, 1968, and now U.S. Pat. No. 3,615,346 issued Oct. 26, 1971.

SUMMARY OF THE INVENTION

The invention relates to the production of metals or metal alloys in an electric reduction furnace using a charge containing manganese and/or silicon and/or chromium.

While fully-enclosed furnaces are in use for the production of pig iron, ferro-manganese and calcium carbide, with the reduction gases being exhausted and cleaned, to date alloys containing silicon and chromium have been produced in open electric reduction furnaces.

Open furnaces are used in the production of the alloys specified above since relatively high temperatures—in the order of about 1,7000° to 2,000°C—are required for the production of alloys containing silicon and chromium, the exact reaction temperature being governed by the silicon content. At such high reaction temperatures, the reduction gases leave the surface of the charge at comparatively high temperatures, and this can easily lead to the formation of sinter arches on the charge surface. These sinter arches or bridges greatly restrict the permeability of the charge surface for gases. As a result, the sudden eruptions of very hot gases through the surface are encountered, and the temperature of such gases can exceed 2,000°C. The eruption of hot gases greatly stresses all of the furnace elements and has very adverse effects on the furnace process. To avoid such eruptions, the charge surface must be worked at regular intervals. Normally, thick iron rods are used for this purpose. These are handled manually, or in the case of larger-capacity furnaces, manually-controlled poking or stirring machines mounted on the furnace platform are used.

In the case of open furnaces, the reduction gas generated in the reduction area is burned as it exits from the charge surface. The reduction gas generated during such processes has a CO content of about 80 to 90%. For the complete combustion of one unit of this reduction gas a volume of air equalling roughly 2.5 times the gas volume is required.

This ratio is known as the "air factor" and equals $n = 1$.

During the combustion of the reduction gas, temperatures in the order of 2,400° to 2,600°C are generated. Normally, open furnaces are equipped with gas-collecting hoods connected to a stack for the evacuation of the waste gases formed. The waste gases are evacuated through the stack either by natural draught or aided by an exhaust fan, and then discharged into the atmosphere.

Because of the high combustion temperatures and the stack draught exhaust process, such a volume of air is sucked into the combustion area between the surface of the charge and the gas hood that in practical operations waste gas temperature of about 100° to 200°C are met.

This operation gives rise to relatively large volumes of waste gases. The table given below shows several examples for various processes and furnace sizes:

| Furnace Size | Product | Generated Reduction Gases Nm³/h | Waste Gas Volume at 150°C Nm³/h | Air Factor $n$ |
|---|---|---|---|---|
| 20 MW | 75% FeSi | 4,000 | 315,000 | 30 |
| 20 MW | SiCr | 3,600 | 284,000 | 30 |
| 20 MW | 42% Si Si-metal | 3,300 | 256,000 | 30 |
| 40 MW | 75% FeSi | 8,000 | 630,000 | 30 |
| 40 MW | SiCr | 7,200 | 570,00 | 30 |

The waste gases from open reduction furnaces of this type contain about 1.5 to 2.5 grams of dust per Nm³, depending on the process involved. This dust is discharged into the atmosphere together with the waste gases. The higher dust quantities applies to processing involving higher silicon contents, for example, 75% FeSi and Si-metal. The lower values apply to processes involving lower silicon contents, for example, 45% FeSi, SiCr and SiMn. In the case of a 20 MW furnace for the production of 75% FeSi, some 800 kg of dust per hour or approximately 19,000 kgs of dust per day are discharged into the atmosphere together with the waste gases.

Such dust is superfine and is composed mainly of $SiO_2$ and/or MnO and/or CrO, or combinations of these metals oxides, the composition depending on the process used. The main reason for the generation of the dust can be traced to the fact that the metals reduced during the actual reduction process—in particular Si and Mn or Cr—are evaporated, and oxidize again on leaving the reaction chamber. These superfine particles are carried off by the gases leaving the furnace. In addition, fines from the furnace charge are also removed by the exhaust gases.

For some considerable time, efforts have been made to remove the dust from the gases leaving open reduction furnaces to eliminate or at least reduce air pollution.

The investigations conducted thus far, and the dust separation processes developed as a result of these investigations, have revealed that it is very difficult to remove the entrained dust in a gas-cleaning or dust separating plant, and that the specified degrees of purity of the cleaned waste gases can be achieved only with a substantial expenditure. Because of the relatively large volume of waste gases generated and the degrees of purity required for the gases, the plant necessary to remove the dust is of such a size that, compared with the furnace size, it is extremely uneconomical. The same is also true for the investment, operating, and maintenance costs.

SUMMARY OF THE INVENTION

In view of these factors, the object of the present invention is to change the mode of operation and design of open electric reduction furnaces so that the waste gases from such furnaces can be cleaned to the specified degrees of purity on an economically feasible basis.

In accordance with the invention, this aim is achieved by reducing the charge in a furnace closed by a roof. In addition, combustion air is introduced into the furnace through intake openings having a variable inlet cross section. The volume of the combustion air supplied per unit of time is based on a continuously-measured temperature and/or analysis of the waste gases exhausted from the furnace whereby the CO in the reduction gases is burned to $CO_2$ at a volume ratio of $n = 1.2$ to $n = 5$ and at a waste gas temperature of between 1,000° and 1,500°C measured at the point the gases leave the furnace chamber. The term $n$ denotes the ratio of combustion air to reduction gas under conditions of complete combustion, with the ratio of combustion air to reduction gas averaging 2.5 : 1 and being variable within certain limits as a factor of the reduction gas analysis.

An advantageous feature of the invention provides for local working of the charge to ensure, at all times, that the surface layer remains uniformly loose, such working of the surface of the charge being effected by using one or more poking or stirring devices capable of continuous operation. The extent of the surface working performed is a function of the temperature distribution throughout the entire furnace chamber, the temperature being measured continuously by means of thermometer probes spaced over the area concerned and located in the vicinity of the furnace roof.

A future feature of the invention lies in the fact that the operation of the stirring devices for the continuous maintenance of a uniformly loose charge surface is manually controlled on the basis of visual observation of differences in brightness and the distribution of the same over the charge surface using one or more observation instruments that respond to heat radiation. Another advantage exists in the fact that such manual control of the stirring device movements is limited by a fixed control program that prevents the poker as such from being moved into a protective zone around the electrodes.

The further features of the invention provide for the device effecting a series of stirring operations in a limited section of the furnace in accordance with a fixed program and in such a way that certain areas lying on concentric circles are worked in sequence, and also for the fixed stirring program being capable of operation within a limited section of the furnace—it being possible to select such section—as a function of the temperature gradients established by the continuous measurement of the temperature distribution throughout the entire furnace chamber.

Finally, as a function of the temperature distribution throughout the entire furnace chamber as established by the area-spaced thermometer probes, one or more stirring devices can be employed in the limited furnace section exhibiting the highest temperature gradients, and one or more observation instruments responding to heat radiation can then be set to the same limited section of the furnace, and also the movement of the stirring device can be directed into the point exhibiting the highest temperature as a function of the highest local temperature established by the observation instrument.

The furnace normally features a water-cooled roof. As usual, the furnace roof also features gas-tight apertures for the gas extraction hoods, charging tubes, and the electrodes.

In accordance with the invention, the main feature of the furnace lies in the fact that the roof of the furnace contains apertures arranged about its circumference to permit the entry of the air volume needed for the CO combustion process, the effective intake cross-section of such apertures being variable as a function of the furnace process data.

A further characteristic of the reduction furnace is that the furnace roof or those parts of which that are directed toward the furnace shell and sealed off against the roof as such can be raised and lowered during furnace operation, their lifting movement being controlled as a function of the furnace process data.

In accordance with a further feature of the invention, the volume of air needed for combustion of the CO gas enters the furnace through one or several apertures and is controlled, by varying the suction rate of the gas exhaust facility, in the range of $n = 1.2$ to $n = 5$ as called for by the furnace process condition.

Finally, one of the features of the furnace roof design in accordance with the invention provides for several or all of the apertures in the furnace roof used to suck in air also being used as entry ports for the stirring or poking device arms.

The features of the invention permit a drastic reduction in the volume of waste gas encountered during the operation of electric reduction furnaces, while the expenditure for the overall furnace plant remains within economically justifiable limits and affords adequate consideration for the legal provisions regarding air pollution.

However, the advantages of the proposed invention are not exhaustively listed in the foregoing. In addition, all reduction processes that to date have been carried out in open electric reduction furnaces can, in principle, be effected in accordance with the invention if the combustion chamber is appropriately designed and the air inlet openings are properly controlled and distributed. Further, the invention also permits the air factor of approximately $n = 30$ in the case of open furnaces to be reduced to between $n = 1.2$ to $n = 5$. This reduces the waste gas volumes o such open furnaces to the ratio of:

$$V = (n_1 + 1.19)/(n_2 bz 1.19)$$

where
$n_1$ = air factor using open electric reduction furnaces—on average = 30—and
$n_2$ = air factor using a furnace in accordance with the invention—approx. 1.2 to 5

Example:

$$V = (30 + 1.19)/(2 + 1.19) \approx 10$$

This means that the waste gas volume is cut to approximately one-tenth.

The following table shows a comparison between the waste gas volume of known open furnaces and those of furnaces in accordance with the invention:

| furnace size | product generated reduction gas Nm³/h | waste gas volume of open furnaces 150°C Nm³/h | air factor n | waste gas volumes using new process Nm³/h | air factor n using new process |
|---|---|---|---|---|---|
| 20 MW | 75% FeSi 4,000 | 315,000 | 30 | 31,800 | 2 |
| 20 MW | SiCr 3,600 | 284,000 | 30 | 28,700 | 2 |
| 20 MW | 42% Si Si-metal 3,300 | 257,000 | 30 | 26,000 | 2 |
| 40 MW | 75% FeSi 8,000 | 630,000 | 30 | 63,600 | 2 |
| 40 MW | SiCr 7,200 42% Si | 570,000 | 30 | 57,400 | 2 |

In addition, known types of enclosed electric reduction furnaces can be provided with apertures spaced about the circumference of the roof, which—as mentioned above—can be opened and closed. By opening a flap on such furnaces, the process can be regulated at any time during the operation of the furnace, whereas to date such furnaces always had to be switched off for such purposes. However, in the case of such an operation, the air factor is less than 1.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

FIG. 3 is a partial sectional view on an enlarged scale of the furnace roof shown in FIG. 1 in which an arm of a stirring device extends through an aperture;

FIG. 4 is a partial sectional view of the furnace roof similar to FIG. 3, but the aperture for combustion air intake is almost fully closed;

DESCRIPTION OF THE PREFERRED EMBODIMENT

Figure 1:
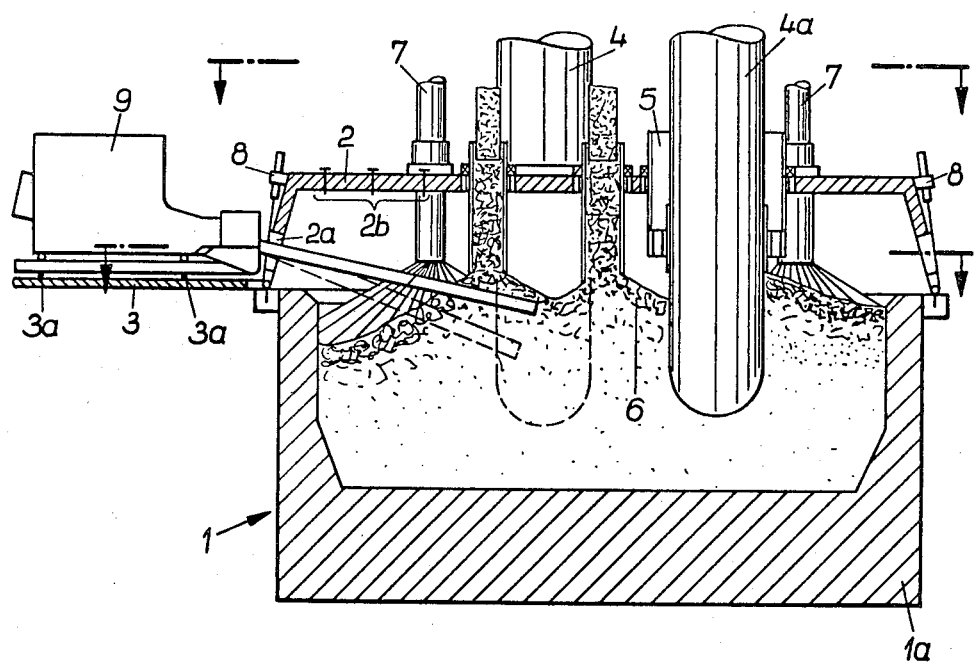
FIG. 1 is a vertical sectional view of a schematic representation of an enclosed electric reduction furnace embodying the present invention.
Figure 2:
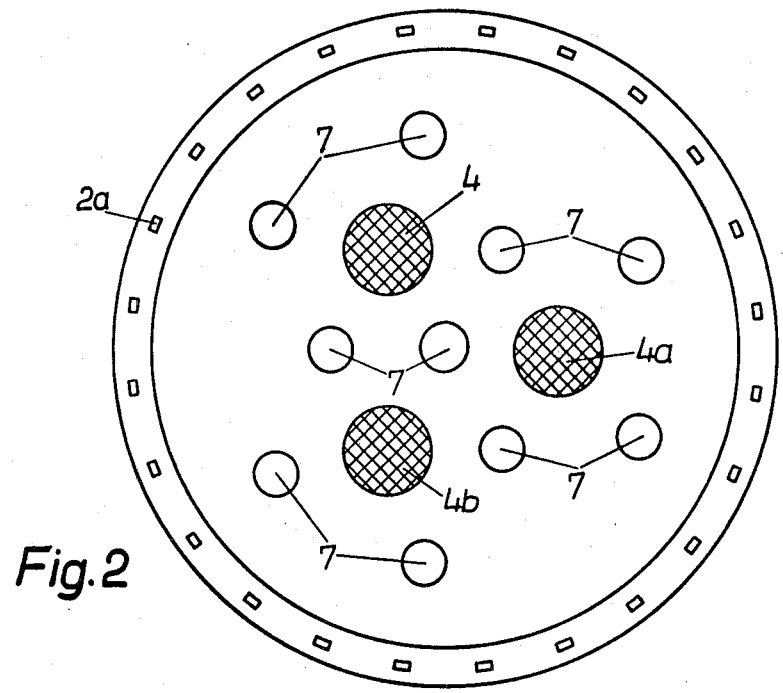
FIG. 2 is a plan view taken along the line A–B in FIG. 1.

A known open-type furnace 1 is shown with a roof 2 similar to the known enclosed furnace, which includes a known forced flow water-cooling system using tubular coils (not shown). The height of furnace roof 2 depends on the combustion or gas space between the surface of the charge and the roof as required for the process in question.

The furnace roof 2 can be designed in the known way as a self-supporting structure positioned on the furnace shell 1a or on the furnace operating platform 3 and for sealing against the furnace shell 1a or for suspension from the next higher platform by using a suitable system. Electrodes 4, 4a, and 4b extend through the furnace roof in the known manner, each passing through a sleeve 5 and being gas-tight. Placement of the charge into the furnace 1 is also effected in a known way using appropriately distributed charging tubes 7 extending through gas-tight seals in the furnace roof. The furnace roof 2 contains apertures 2a uniformly distributed about its circumference, or an annular gap may be used, the intake cross-sections of which can be varied by means of electro-pneumatic and/or hydraulic and/or pneumatic control systems 8. Apertures 2a in furnace roof 2 are used for the intake of air (FIG. 4), needed for combustion of the reduction gases generated in the furnace 1.

Upon mixing with the air entering the furnace, the furnace reduction gas is fully burned in the combustion space between the furnace roof 2 and the surface of the charge 6. Complete combustion of the generated reduction gases calls for a volume of air equalling an average about 2.5 times the reduction gas volume. This air factor is normally expressed as: $n = 1$.

In accordance with the invention, an air factor of between $n = 1.2$ and $n = 5$ is used for complete combustion and for cooling purposes during the operation of the furnace, the waste gases of the combustion process being exhausted from the furnace chamber by means of water-cooled exhaust ducts built into the furnace roof (not shown).

Furnace operation with an air factor of $n = 1.2$ to $n = 5$ produces approximate waste gas temperatures of between 1,500° and 700°C.

Figure 5:
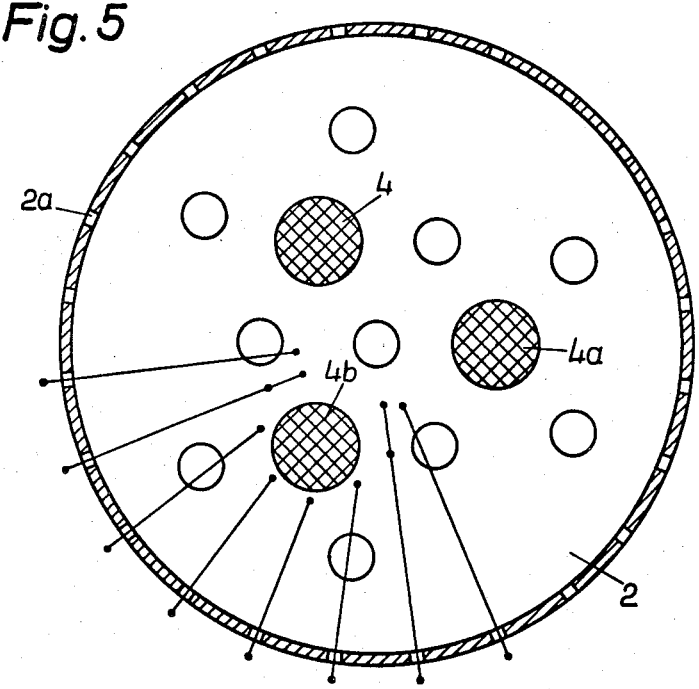
FIG. 5 is a horizontal section through the furnace roof along the line C–D of FIG. 1, with the positions of the stirring arm in the vicinity of an electrode indicated schematically.
Figure 6:
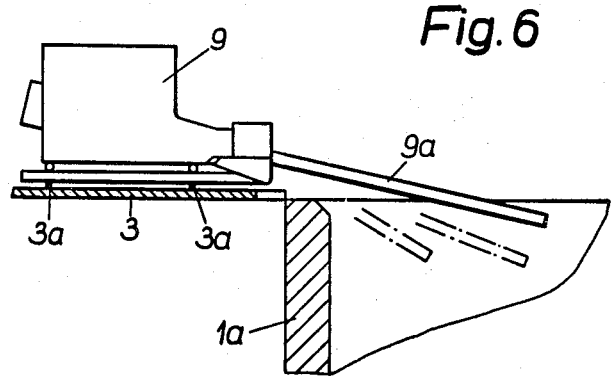
FIG. 6 is a partial side view of the stirring device illustrated schematically, and indicating the various possible positions of the arm.
Figure 7:
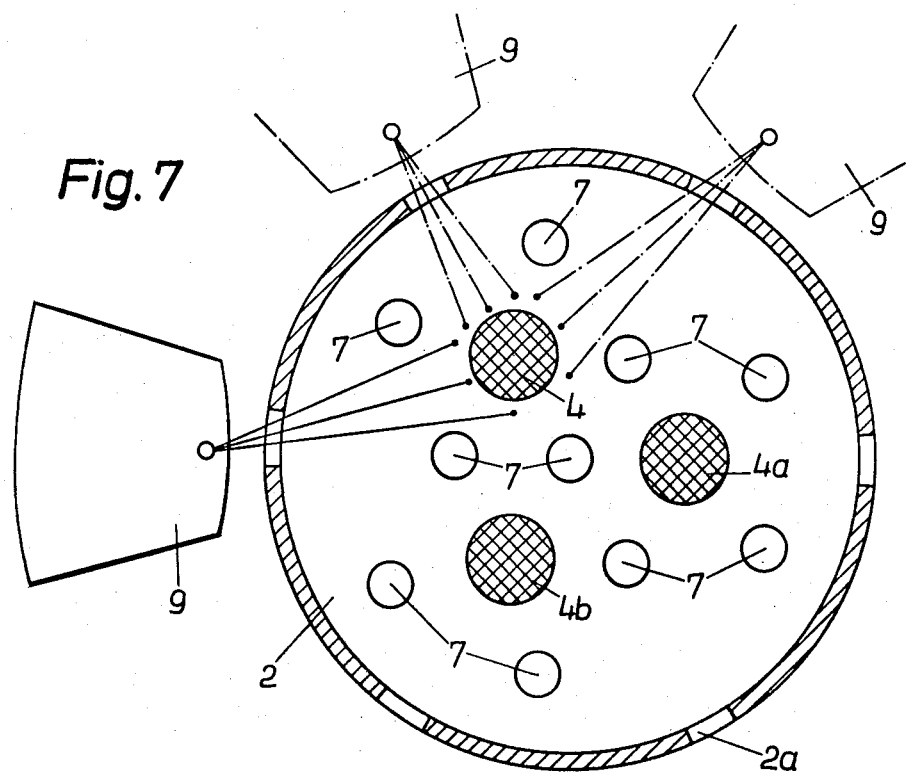
FIG. 7 is sectional view through the top of the furnace, roughly corresponding to line C–D in FIG. 1, schematically indicating the stirring device and the area around an electrode that can be reached by its arm.
Figure 8:
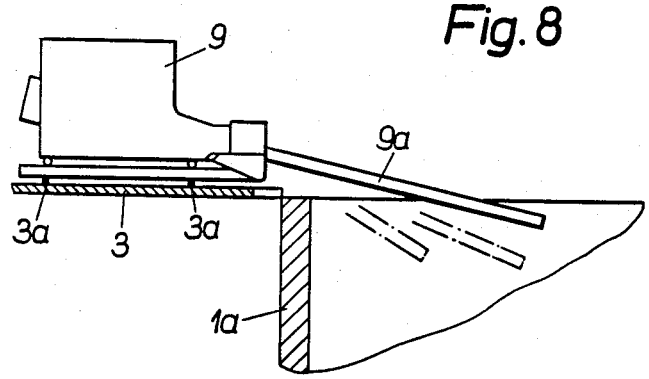
FIG. 8 is a side view illustrating the stirring device shown in FIG. 7 with the various possible vertical positions of its arm.

For the reasons stated above, the charge 6 must be worked for loosening its surface to maintain gas permeability in the case of processes involving high reaction temperatures. To this end, apertures 2a in the roof 2 of the furnace 1 are arranged so that, using a stirring or poking device 9 arranged to be moved around within the furnace 1, the surface of the charge can be uniformly worked across the entire furnace chamber, the device 9 moving on a circular track 3a arranged around the furnace 1. The stirring device 9 works the surface of the charge through the air intake apertures 2a in a section of the furnace chamber that can be selected (FIGS. 5, 7), the working of the surface being carried out in accordance with a preselected program in such a way that points lying on concentric circles are worked in sequence, the programming unit leaving out a protective area around the electrodes 4, 4a, and 4b.

Thermometer probes 2b are arranged over the area of the furnace roof 2 and continuously measure the temperature and indicate the temperature distribution over the entire furnace chamber. Selection of the furnace section to be worked by the stirring device is effected in accordance with the highest temperature gradient of the indicated temperature distribution.

The stirring operation in certain sections of the furnace can be initiated manually or automatically by integration of the temperature gradients. The temperature measured by thermometer probes 2b in furnace roof 2 and the temperature distribution in the furnace chamber permit determination of the section of the furnace in which the the surface of the charge 6 must be worked. Accordingly, the stirring device 9 is moved into the appropriate position. Using observation instruments (not shown) that respond to heat radiation and show the temperature distribution across the surface of the charge on a viewing screen, an exactly positioned stirring operation can be initiated manually or automatically. Infrared cameras or similar appliances as used for military purposes be employed, but these do not as such form part of the invention.

While specific embodiments of the invention have been shown and described in detail to illustrate the application of the inventive principles, it will be understood that the invention may be embodied otherwise without departing from such principles.

What is claimed is:

1. An electric reduction furnace for the production of metals and metal alloys using a charge of material containing at least one of the group of materials consisting of manganese, silicon and chromium, said furance comprising, in combination, means defining a furnace chamber having a base and side walls; a roof forming a closure for said furnace chamber; plural laterally spaced electrodes extending, in gas-tight relation, through respective openings in said roof into said furnace chamber; at least one charging tube extending, in gas-tight relation, through said roof for supplying the charge into said furnace chamber; said roof having means for exhausting waste gases from said furnace chamber; laterally opening combustion air inlets arranged in laterally spaced relation around said furnace and communicating with said furance chamber; respective means operable to vary the cross-sectional flow areas of said combustion air inlets to vary the combustion air flow into said furnace chamber; temperature sensing and indicating means arranged within the furnace chamber over the area of said roof for continuously measuring the temperature distribution throughout said furnace chamber; a stirring device on the exterior of said furnace and including a retractable stirring arm from projection through a selected combustion air inlet and through the surface of the furnace charge to maintain the permeability of the surface of the charge for release of combustion gases; and means mounting said stirring device for movement around the exterior of said furnace for alignment with said selected combustion air inlets; said stirring device being programmed for operation of a stirring arm through selected combustion air inlets and to limit the operation of said stirring arm to areas of the charge outside protective areas around each electrode; whereby, in accordance with the indication of said temperature sensing and indicating means, said stirring device can be moved into alignment with a selected combustion air inlet corresponding to a furnace sector where the observed temperature indicates a need for stirring of the furnace charge.

2. An electric reduction furnace, as set forth in claim 1, wherein the combustion air inlets to the furnace chamber comprise a plurality of angularly spaced apertures located in one of said side walls and roof above the surface of the charge within the furnace chamber.

3. An electric reduction furnace, as set forth in claim 2, wherein means are disposed about the exterior of said walls forming the furnace chamber providing an annular track, said stirring device being mounted on said track and selectively movable about the exterior of the furnace chamber for the selective insertion of its said stirring arm through said angularly spaced apertures for working different sections of the charge contained within the furnace chamber.

4. An electric reduction furnace, as set forth in claim 1, wherein said means for continuously measuring the temperature distribution throughout the furnace chamber comprises a plurality of temperature probes arranged in spaced relationship over the area of the inner surface of said roof for continuously measuring the temperature and indicating the temperature distribution over the entire furnace chamber.

* * * * *